United States Patent

[11] 3,608,575

| [72] | Inventors | Wilhelm Jurisch<br>Nelligen-Parksiedlung;<br>Gerhard Walliser, Waiblingen; Heinrich<br>Ulrich, Metzingen, Wurthemberg, all of<br>Germany |
|---|---|---|
| [21] | Appl. No. | 808,892 |
| [22] | Filed | Mar. 20, 1969 |
| [45] | Patented | Sept. 28, 1971 |
| [73] | Assignee | Daimler-Benz Aktiengesellschaft<br>Stuttgart-Unterturkheim, Germany |
| [32] | Priority | Mar. 20, 1968 |
| [33] | | Germany |
| [31] | | P 17 73 006.2 |

[54] DIFFERENTIAL-PRESSURE REGULATING VALVE ASSEMBLY ESPECIALLY FOR CONTROL INSTALLATIONS OF GAS TURBINE DRIVE UNITS
30 Claims, 5 Drawing Figs.

| [52] | U.S. Cl. | 137/117 |
|---|---|---|
| [51] | Int. Cl. | G05d 11/00 |
| [50] | Field of Search | 137/108, 115, 117 |

[56] References Cited
UNITED STATES PATENTS

| 2,594,689 | 4/1952 | Sharp et al. | 137/117 X |
| 2,989,975 | 6/1961 | Gartner | 137/117 |
| 3,311,125 | 3/1967 | Beasley | 137/117 |

FOREIGN PATENTS

| 1,099,802 | 2/1961 | Germany | 137/108 |

*Primary Examiner*—Laverne D. Geiger
*Assistant Examiner*—David J. Zobkiw
*Attorney*—Craig, Antonelli and Hill ABSTRACT: A differential pressure control valve assembly, especially for control installations of gas turbine drive units, in which the control slide valve controlling the backflow quantity of liquid is constructed as servo device only controlled by the control diaphragm which limits one or several servo pressure chambers for receiving a working medium removed from the hydraulic circulation system and having a variable servo-adjusting pressure between the higher hydraulic pressure upstream of the metering place and the lower hydraulic pressure downstream of the metering place; the servo-adjusting pressure is modulated in case of occurring control deviations by a control valve actuated by the control diaphragm in the sense that in case of exceeding the intended value of differential pressure, a larger return quantity is adjusted to by the piston slide valve and in case of dropping below the intended value of differential pressure, a smaller return quantity is adjusted to.

INVENTORS
WILHELM JURISCH
GERHARD WALLISER
HEINRICH ULRICH

ATTORNEYS

DIFFERENTIAL-PRESSURE REGULATING VALVE ASSEMBLY ESPECIALLY FOR CONTROL INSTALLATIONS OF GAS TURBINE DRIVE UNITS

The present invention relates to a differential-pressure-regulating valve, especially for fuel-regulating installations of gas turbine drive units, for the purpose of maintaining constant the differential pressure at an orifice, either fixed or variable in its cross section, or at a controlled metering slot, that is disposed in a hydraulic control circulatory system subjected to the pressure of a supply pump, which essentially consists of a piston slide valve controlling the regulator return-flow or bypass quantity flowing back to the supply pump, the piston slide valve being equalized as regards forces in both adjusting directions with the intended value of differential pressure prevailing, and of a diaphragm which is acted upon, on the one hand, by the larger hydraulic pressure $p_1$ (pump pressure) existing upstream of the orifice or metering slot and, on the other, by the smaller hydraulic pressure $p_2$ downstream of the orifice or metering slot as well as by the pressure of a spring (differential pressure spring) equalizing the differential pressure.

With fuel-control installations of gas turbine drive units, it is known according to the two German Patents Nos. 1,096,119 and 1,099,802, 46f8/01 to coordinate to a fuel-metering installation consisting of a metering slot and of a metering piston, a return-flow or bypass regulating valve which has the purpose to control the excess fuel quantity of a supply pump dependent on rotational speed but not regulated as to quantity thereof, from the pressure side thereof to the suction side thereof and thereby to maintain constant in its value the differential pressure occurring at the metering slot independently of the position of the metering piston or of the prevailing opening cross section of the metering slot.

It is achieved by a constant differential pressure at the metering slot which quite generally represents a controlled orifice (variable in its opening cross section) that the fuel quantity flowing in the nozzle supply line leading to the injection nozzles within the combustion chamber, is exclusively a function of the prevailing opening or flow cross section at the metering slot, independently of the rotational speed of the fuel supply pump, not regulated as regards quantity. The return-flow or bypass control valve for maintaining constant the differential pressure at the metering slot primarily consists in the known case of a piston slide valve with a control piston, properly speaking, and of an elastic diaphragm rigidly connected with this piston unit and securely clamped in the valve housing, which diaphragm is acted upon on its one side by the higher hydraulic pressure $p_1$ upstream of the metering slot (pump pressure) and whose other side is acted upon by the lower hydraulic pressure $p_2$ prevailing downstream of the metering slot as well as by a differential pressure equalization spring. Furthermore, the pressure $p_1$ upstream of the metering slot acts at the piston slide valve against one of its end faces and the pressure $p_2$ downstream of the metering slot together with the differential pressure equalization spring act against its other end face. With an existing intended value of differential pressure, the forces acting in the one direction and in the opposite direction at the diaphragm and at the piston slide valve are equalized, which more or less opens by its movements the cross section of a discharge control bore in order to thus vary the regulator bypass or return-flow quantity flowing back to the supply pump, with the purpose to maintain constant the differential pressure at the metering slot independently of the position of the metering piston. During the output control of the drive unit by adjusting movements of the metering piston over the metering slot, regulating or control deviations occur in the form of an exceeding or of a falling below of the intended value of the differential pressure at the metering slot. In case of exceeding the intended value of the differential pressure, the piston slide valve of the bypass control valve is automatically displaced by corresponding deflections of the diaphragm into such a position relative to the bypass or discharge control bore that the regulator return-flow or bypass quantity is increased whereas in case of falling below the intended value of the differential pressure, the regulator return-flow or bypass quantity is reduced.

However, the setup and manner of functioning of the prior art construction of a differential-pressure-regulating valve no longer assures a completely satisfactory and unobjectionable operating behavior with the use in larger fuel-regulating installations with increasing return-flow or bypass quantities. Thus, with the application of the known principle, the larger disturbance forces, caused by increased mechanical friction and flow influences, would have to be absorbed by a diaphragm that is larger in diameter. In addition to the stiffening of the spring equalizing the increased differential force, which is necessitated by the enlarged effective surface of the diaphragm, this differential pressure spring would have to be additionally constructed softer in its effect in order not to cause a further increase over the entire regulating range in the harmful proportionality, already present anyhow by its spring characteristic, in case of increased control paths. In view of all of these circumstances, such a hydraulic regulating installation for the control of the return-flow or bypass quantity, in order to keep constant the pressure differential at the metering slot, would not only become relatively long but also inaccurate in its operating behavior.

The present invention aims at creating a differential-pressure-regulating valve with such a construction that avoids the disadvantages of the known installations and also assures with relatively large return-flow quantities to be controlled, a completely satisfactory operating behavior of the control valve over the entire regulating range or over the entire control path, independently of the length thereof, together with a compact structural volume and especially with a relatively short structural length.

As solution to the underlying problems, it is proposed according to the present invention to construct the piston slide valve controlling the regulator return-flow quantity of the differential pressure control valve as a servo device only controlled by the diaphragm, which by means of a piston surface or partial piston surface or surfaces effective in the respective adjusting direction limits one or several servo pressure chambers for the accommodation of a working medium removed from the hydraulic circulatory system upstream of the orifice or of the metering slot with a variable servo-adjusting pressure $p_v$ lying between the higher hydraulic pressure $p_1$ upstream of the metering slot and the lower hydraulic pressure $p_2$ downstream of the metering slot, which servo-adjusting pressure is modulated during the occurrence of control deviations by a control valve actuated by the control diaphragm in the sense that in case of exceeding the intended value of differential pressure a larger return-flow quantity and upon falling below the intended value of differential pressure, a smaller return-flow or bypass quantity is controlled by the piston slide valve.

In realization of the present invention, the differential-pressure-regulating valve includes two control pressure spaces separated from one another by the control diaphragm, and more particularly one control pressure space connected with the line section extending downstream of the metering slot and possessing a lower hydraulic pressure $p_2$ and another control pressure space connected with the line section upstream of the metering slot and possessing a higher hydraulic pressure $p_1$ which is in communication with the servo pressure chamber or chambers which is or are controlled for the production of the variable servo-adjusting pressure by the control valve coordinated centrally to the control diaphragm by way of a variable valve cross section $a$ in the sense that upon exceeding intended value of differential pressure, the valve cross section $a$ increases whereas in case of falling below the intended value of differential pressure, the valve cross section $a$ is blocked or closed with simultaneous maintenance of a connection between the servo pressure chamber or chambers and the control pressure space with the lower hydraulic pressure $p_2$ by way of a throttled control bore in the control diaphragm or in the control valve.

A further feature of the present invention resides in coordinating the control diaphragm to the control slide valve and to clamp the control diaphragm in the control slide valve. By the thus-formed complete control servo piston unit the constructive design of the fixed regulator housing is considerably simplified.

Furthermore, the possibility exists according to the present invention to clamp the control diaphragm in the fixed housing separately from the movable piston slide valve. The abutment of the differential pressure spring may be arranged thereby in an advantageous manner adjustable from the outside for the adjustment or change of its prestress so that the change of the prestress of the differential pressure spring can be undertaken also during the operation of the differential pressure control valve.

For the purpose of solving the further problem, additionally posed within the frame of the present invention, which is seen to reside in creating for the individual installations of the differential pressure control valve, the most favorable localization within the entire fuel-regulating system, it is further proposed according to the present invention to coordinate the servo installation of the differential-pressure-regulating valve or the piston slide valve to the supply pump unit and the control installation producing the variable servo-adjusting pressure $p_v$ for the adjustment of the piston slide valve, to the regulator or to the metering device and to transmit the variable servo-adjusting pressure $p_v$ by way of pressure line to a servo pressure chamber limited on one side by the piston slide valve. In realization therefore, the piston slide valve is constructed as single-step piston which in the direction in which the discharge control bores are opened up, is acted upon on its smaller end face by the pump pressure and in the same direction with respect thereto on its annular surface by the variable servo-adjusting pressure $p_v$ whereas the lower hydraulic pressure $p_2$ prevailing downstream of the metering slot as well as a servo pressure equalization spring engage in the other direction. The advantages achieved thereby will become more obvious hereinafter.

The differential-pressure-regulating valve of the present invention is also applicable as bypass or return-flow control valve for achieving a constant bypass or return-flow quantity over the entire regulating range independently of the variable supply pressure or of a variable supply quantity to a hydraulic load arranged upstream of the bypass or return-flow control valve, for example, fuel injection nozzles according to the aforementioned German Pat. No. 1,099,802. The differential pressure is thereby kept constant at a fixed orifice coordinated to the differential pressure regulating valve.

With the present invention is generally connected the advantage that independently of the prevailing control position or of the traversed adjusting path of the servo-actuated piston slide valve controlling the return or bypass quantity, the control deflections of the diaphragm functioning now only as measurement sensing member and control member, by means of which the variable servo-adjusting pressure for the movement of the piston slide valve is produced and modulated, and simultaneously the paths of the differential pressure spring can be each kept within such small limits from the neutral starting position thereof so that the proportionality inherent in the control diaphragm and the differential pressure spring, does not disturb the control operations and is not able to influence the same unfavorably in its accuracy.

These and further objects, features and advantages of the present invention will become more obvious from the following description and appending claims, when taken in connection with the accompanying drawing, which shows, for purposes of illustration only several embodiments in accordance with the present invention, and wherein:

Figure 3:
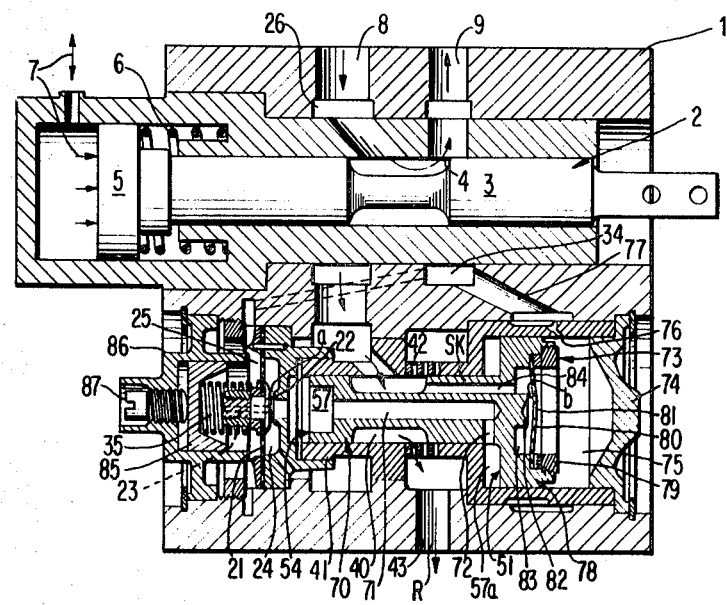
FIG. 3 is a cross-sectional view, similar to FIGS. 1 and 2, through a still further modified embodiment of a differential pressure control valve assembly in accordance with the present invention.
Figure 3A:
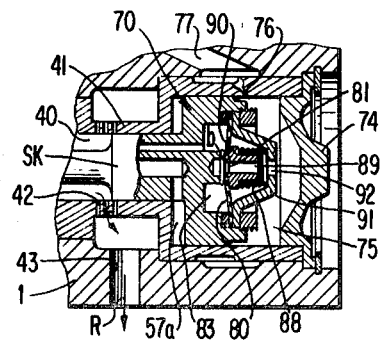
Figure 4:
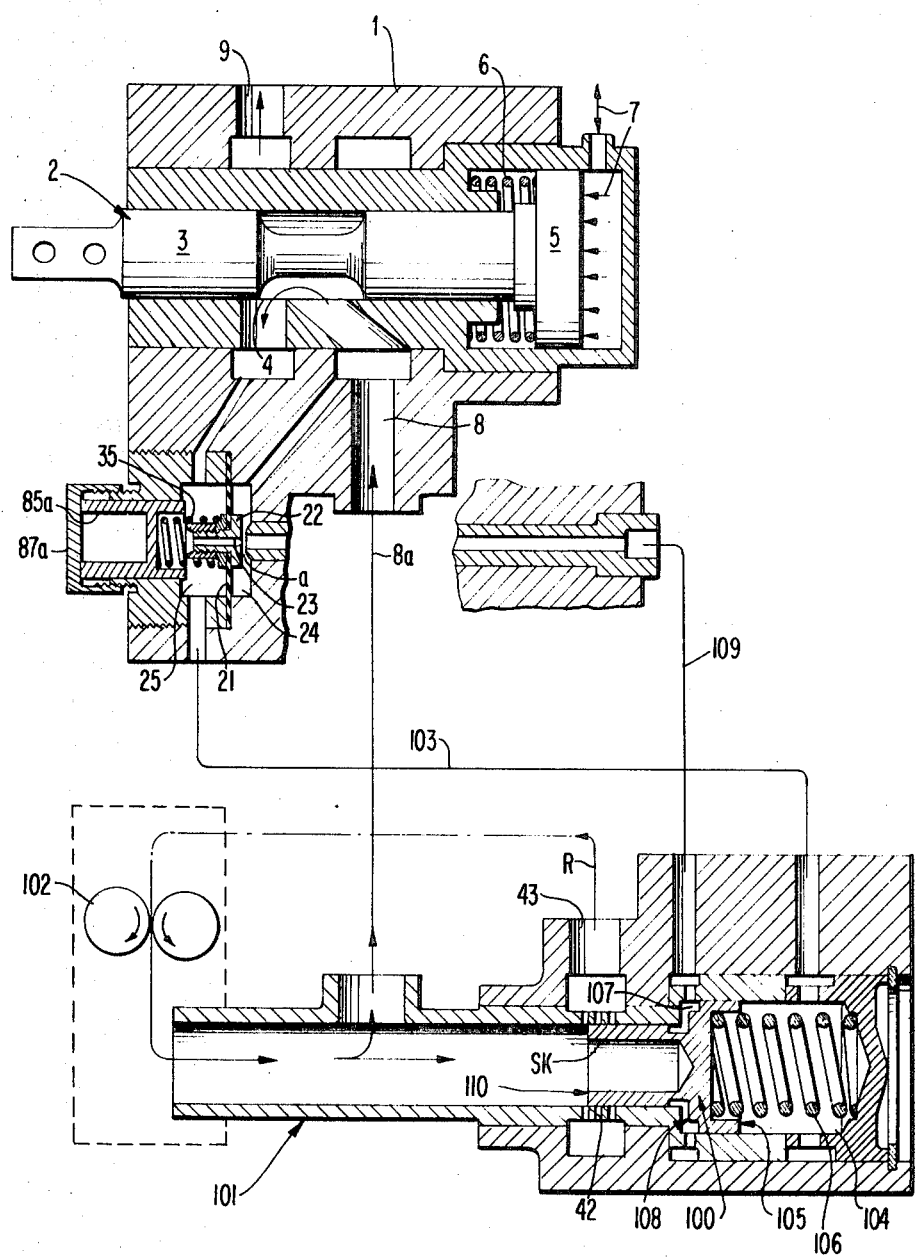

FIG. 3a is a partial cross-sectional view illustrating a modified construction of the differential pressure control valve of FIG. 3; and FIG. 4 is a somewhat schematic, partial cross-sectional view through a differential pressure control valve assembly for fuel control installations of gas turbine drive units in accordance with the present invention in which the bypass valve is coordinated to the supply pump unit.

Figure 1:
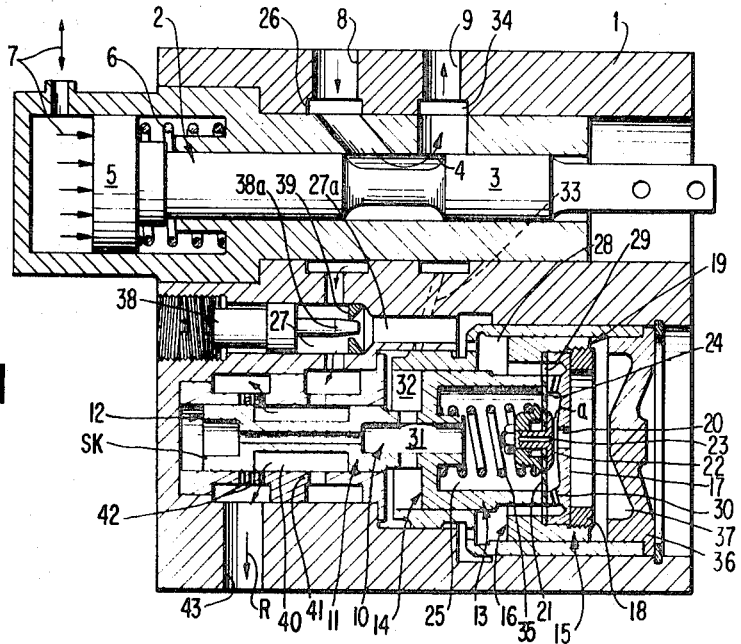
FIG. 1 is cross-sectional view through a first embodiment of a differential pressure control valve assembly for fuel-control installations of gas turbine drive units in accordance with the present invention.

Referring now to the drawing wherein like reference numerals are used throughout the various views to designate like parts and more particularly to FIG. 1, reference numeral 1 designates in this figure the housing of a fuel control assembly of a fuel-metering installation generally designated by reference numeral 2 which essentially consists of a metering piston 3 and of a metering slot 4 controlled by the piston 3. The metering piston 3 is actuated by an adjusting piston 5 which is acted upon, on the one hand, by a return spring 6 and, on the other, by a hydraulic pressure medium 7, whose pressure magnitude is dependent on the preselected output or fuel quantity to be injected. The metering slot 4 is disposed in a hydraulic control circulatory system, in the illustrated embodiment in a fuel control circulation whereby the line section 8 disposed upstream of the metering slot 4 is under the pressure of a conventional rotational-speed-dependent supply pump, not regulated in its quantity (not shown) or of an equivalent pressure source, and the line section 9 disposed downstream of the metering slot 4 leads to the fuel injection nozzles (not shown) which are installed conventionally in a combustion chamber. Further details of such a fuel regulatory installation can be seen from German Patent Nos. 1,096,119 and 1,099,802. The metering slot 4 represents generally an orifice controlled in its cross section, upstream of which prevails a higher pressure $p_1$ and more particularly the pump pressure, and downstream of which prevails a lower pressure $p_2$; the differential pressure resulting therefrom is 17 be maintained constant over the entire regulating range or output range of the control installation as the intended value of differential pressure by the differential pressure control valve assembly to be described more fully hereinafter. The differential pressure control valve assembly controls the respective regulator return-flow or bypass quantity R flowing back to the suction side of the pump and essentially consists of a piston slide valve, according to FIG. 1, in the form of a two-step piston generally designated by reference numeral 10 including a first piston part generally designated by reference numeral 11 which forms with its left outer end the control piston SK, properly speaking, that has the smaller end surface 12 of the two-step piston 10, further a second piston part generally designated by reference numeral 13 that forms the smaller annular surface generally designated by reference numeral 14 and finally a third piston part generally designated by reference numeral 15 which forms on its axially inner side the larger annular surface 16 and on its axially outer side together with a cover 17 and a ring nut 18, the larger end face 19 of the two-step piston 10. The cover 17 coordinated to the third piston part 15, to be referred to hereinafter as control valve cover 17, is provided with a central passage bore 20 and serves to clamp with the aid of the ring nut 18, a control diaphragm 21 that carries centrally a control valve 22, in which is provided a control bore 23 constructed as throttle bore. The control diaphragm 21 subdivides the hollow space arranged on the inside of the piston part 15 into two control pressure spaces 24 and 25. The control pressure space 24 is in communication with the line section 8 disposed upstream of the metering slot 4 by way of an annular space 26 and supply channels 27 and 27a and by way of an annular space 28 as well as by way of supply bores 29 in the control diaphragm 21 and supply bores 30 in the control valve cover 17, whereas the control pressure space 25 is in communication with the line section 9 disposed downstream of the metering slot 4 by way of a central piston channel 31, an annular space 32, a channel 33 and an annular space 34. The control diaphragm 21 is therefore loaded or acted upon, on the one hand (from the right side), by the higher hydraulic pressure $p_1$ upstream of the metering slot 4 and on the other (from the left side) by the lower hydraulic pressure $p_2$ downstream of the metering slot 4 as well as additionally by a differential pressure spring 35 equalizing the intended value of differential pressure so that with prevailing intended value of differential pressure, the control diaphragm 21 is in equilibrium. The central piston channel 31 extends up to the smaller end face 12 so that the latter is also subjected to the lower pressure $p_2$ of the line section 9 which at the same time acts against the smaller annular surface 14 whereas the higher hydraulic pressure $p_1$ of the line section 8 acts in the same direction on the larger annular surface 16.

Between the larger end face 19 of the two-step piston 10 and a housing cover 36 is disposed a servo pressure chamber 37 which is supplied with pressure medium from the control pressure space 24 by way of the passage bore 20, whose pressure magnitude is changed with the aid of the control valve 22 by an increase or decrease of the valve cross section $a$ that is formed between the control valve 22 and the annular area of the control valve cover 17 disposed about the bore 20, in case of control deviations or deviations from a predetermined intended value of differential pressure.

Between the two supply channels 27 and 27a is installed a prethrottle 39, adjustable in its flow cross section with the aid of a cone 38a disposed at an adjusting screw 38, by means of which the desired intended value of differential pressure is adjustable. The piston part 11 includes in its central area a discharge control space 40 which is in communication with the line section 8 by way of channels and annular spaces, not further identified for the sake of clarity, but clearly discernible from the drawing. The discharge control space 40 is connected by way of several discharge control bores 42 arranged in a piston slide sleeve 41 that are controlled by the control piston SK, with a return line 43 that leads to the suction side of the supply pump.

OPERATION

The operation of the differential pressure control valve assembly in accordance with the present invention of FIG. 1 is as follows:

With prevailing intended value of differential pressure, the two-step piston 10 and the control diaphragm 21 are in the positions thereof in equilibrium, i.e., the forces acting on both sides of these two structural parts 10 and 21 equalize themselves. A flow of pressure medium thereby takes place in small quantities from the control pressure space 24 by way of the correspondingly adjusted valve cross section $a$ and the flow bore 20 to the servo pressure chamber 37—whereby a pressure drop occurs—and from the latter by way of the throttled control bore 23 into the control pressure space 25. A pressure $p_v$ builds up in the servo pressure chamber 37 with prevailing intended-value-control condition (prevailing intended value of differential pressure) according to the following equation:

$$p_v = p_1 + p_2/2$$

The smaller end face 12 and the smaller annular face or surface 14 of the two-step piston 10 are together equal in area to the larger annular surface 16 which is equal to half the larger end face 19.

With a control deviation characterized by exceeding the intended farther of differential pressure by reason of an absolute or relative increase of the pump pressure or decrease of the free cross section of the metering slot 4, the pressure $p_1$ in the control pressure space 24 increases or predominates with respect to the pressure $p_2$ in the control pressure space 25 and adjusts the control diaphragm 21 toward the left so that the valve cross section $a$ is temporarily increased. As a result thereof, the pressure in the servo pressure chamber 37 temporarily increases so that the two-stage piston 10 is displaced farther toward the left. The number of discharge bores 42 opened up by the control piston SK increases therewith and the controlled bypass or return-flow quantity R increases whereby the pressure upstream of the metering slot 4 is decreased, and more particularly for such length of time until the intended value of differential pressure is again achieved, at which the control diaphragm 21 and the control valve 22 assume again their neutral starting control position. Simultaneously therewith, the variable working pressure $p_v$ in the servo pressure chamber 37 also adjusts itself again to is neutral equilibrium pressure which is defined by the intended value equation $p_v = p_1 - p_2/2$.

With an occurring control deviation that is characterized by a dropping below the intended value of differential pressure, be it by pressure decrease of the supply pump or increase of the free cross-sectional area of the metering slot 4 by adjusting movements of the metering piston 3 in the direction of "larger fuel quantities," the pressure $p_2$ in the control pressure space 24 whereby the valve cross section $a$ is either decreased or completely closed so that no flow of pressure medium takes place any longer from the control pressure space 24 to the servo pressure chamber In contradistinction thereto, a pressure equalization takes place between the control pressure 25 and the servo pressure chamber 37 which is under higher pressure with respect to the space 25, by a return-flow of pressure medium by way of the control bore 23, i.e., by a pressure decrease in the servo pressure chamber 37, so that a force component becomes free acting from the left on the two-step piston 10 which displaces the latter toward the right so that additionally several of the discharge bores 42 are completely or partly closed whereby the return-flow quantity R flowing back by way of the return line 43 to the suction side of the pump is decreased, and the pressure upstream of the metering slot 4 is increased for such length of time until the intended value of differential pressure is again established at the metering slot 4.

Figure 2:
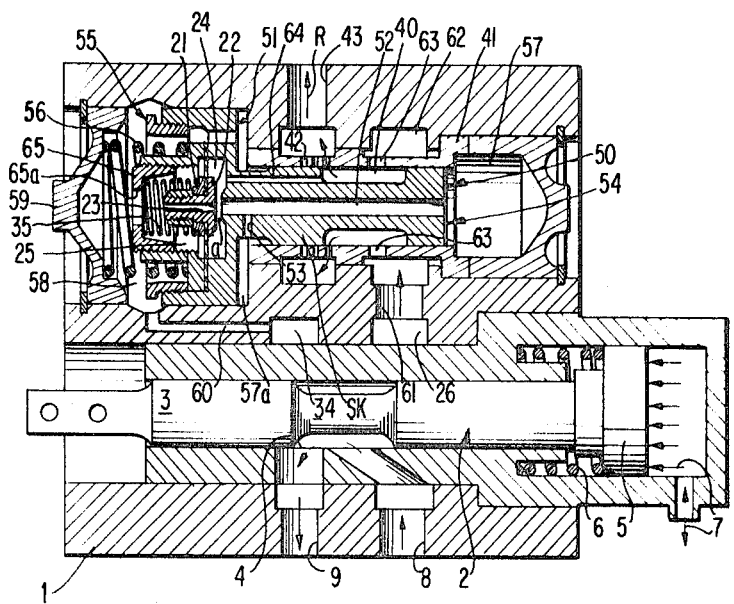
FIG. 2 is a cross-sectional view, similar to FIG. 1, through a modified embodiment of a differential pressure control valve assembly for fuel control installations of gas turbine drive units in accordance with the present invention.

Differing from the construction according to FIG. 1, the piston slide valve according to FIG. 2 is constructed as single-step piston generally designated by reference numeral 50 having only one annular piston surface generally designated by reference numeral 51. Furthermore, two individual servo pressure chambers 57 and 57a are provided in this embodiment in communication with each other by way of bores 52 and 53, whereby the working pressure medium of the one servo pressure chamber 57 acts upon the smaller (right) piston end face 54 and the working pressure medium of the other servo chamber 57a acts upon the annular surface 51 of the single-step piston 50. The larger (left) end face 55 of the piston 50, differing from FIG. 1, is acted upon by the lower pressure $p_2$ prevailing downstream of the metering slot 4 and additionally by a servo pressure equalization spring 56 which is arranged in a servo pressure equalization space 58 that is closed against the outside by a housing cover 59. The connection between the servo pressure equalization space 58 and the line section 9 extending downstream of the metering slot 4 takes place by way of a channel 60 and the annular space 34; the connection of the control pressure space 24 with the line section 8 extending upstream of the metering slot 4 takes place by way of the annular space 26, a return channel 61, a return-flow annular space 62, return-flow bores 63, the annular control discharge space 40 and a bore 64. The differential pressure spring 35 rests with its outer end against an adjusting cap 65 threaded into the single step piston 50, by means of which can be adjusted the prestress of the differential pressure spring 35. The control space 25 is connected with the servo pressure equalization space 58 by way of a central aperture 65a in the adjusting cap 65. As to the rest, the regulating and control operations take place in an analogous manner to that of FIG. 1.

According to FIGS. 3 and 3a, the piston slide valve is constructed analogously to FIG. 2 as single-step piston generally designated by reference numeral 70 with only one annular surface generally designated by reference numeral 51. Also in these embodiments, two individual servo pressure chambers 57 and 57a connected with each other by way of connecting bores 71 and 72 are provided whereby the working medium variable in its pressures magnitude during control deviations, acts in the one servo pressure chamber 57 upon the smaller (left) end face 54 and the working medium in the other servo pressure chamber 57a upon the annular surface 51 of the single-stage piston 70. The larger (right) piston end face 73 encloses together with a housing cover 74 a servo pressure equalization space 75 which is in communication with the line section 9 extending downstream of the metering slot 4 by way of a throttle discharge bore 76, a channel 77 and the annular space 34. A valve diaphragm 80 with a central inlet bore 81 is provided by means of a ring nut 79 on the inside of the larger piston step 78. The diaphragm area about the inlet bore 81 forms together with a seat 82 fixed at the piston, a throttle valve. The valve diaphragm 80 limits, on the one hand, a valve chamber 83 which is in communication with the line section 8 upstream of the metering slot by way of a supply bore 84, the annular discharge control space 40 and by way of channels and annular spaces, clearly visible from the drawing and not further designated by reference numerals for sake of clarity. The valve diaphragm 80 has such a spring characteristic that with regard to the pressure $p_1$ acting thereon, such a valve gap $b$ is adjusted that there prevails during all control situations in the servo pressure equalization space 75 a middle pressure $p_m$, lying between $p_1$ and $p_2$, i.e., constant, which maintains the equilibrium with respect to the servo-adjusting pressure acting, on the other hand, at the piston slide valve 70 with prevailing intended value of differential pressure. Only in this condition does the equation $p_v = p_m$ hold true, which no longer exists with control deviations whereby $p_v$ becomes temporarily larger or smaller than $p_m$. The prestress of the differential pressure spring 35 is according to FIG. 3, also adjustable during the operation from the outside. For this purpose, its outer end is supported against an adjusting piston 85 which is supported in a fixed guide bush 86 so as to be movable in the longitudinal direction, into which is inserted an adjusting screw 87 with the aid of which the adjusting piston 85 can be axially adjusted.

According to FIG. 3a, the valve diaphragm 80 is under the prestress of a closure spring 88 which with its left end rests on a pressure piece 90 provided with a bore 89 and seated at the valve diaphragm 80, and which with its right end is supported at a conically shaped counterabutment 91 in which is arranged centrally a flow bore 92. The prestress of the closure spring 88 is smaller than the pump pressure, i.e., during the operation of the drive unit or of the control installation, the valve gap $b$ is automatically maintained open by the pump pressure whereas after turning off of the drive unit with decreasing pump pressure, the valve gap $b$ is closed by the closure spring 88 so that with the supply pump running out in its rotational speed as a result of its inertia and with a closed metering gap 4, no fuel can undesirably reach by way of the valve gap $b$ of the servo pressure equalization space 75, of the throttle discharge bore 76, of the channel 77, and of the annular space 34, the line section 8 and therewith the fuel injection nozzles.

According to FIG. 4, the return-flow control valve in the form of a single-step piston generally designated by reference numeral 100, (piston slide valve), is coordinated to the supply pump aggregate generally designated by reference numeral 101 and not, as according to FIGS. 1, 2, 3 and 3a, to the fuel-metering installation 2 or to the fuel-regulator as such, so that the bypass or return-flow quantity R to be controlled does not have to be at first supplied from the fuel supply pump 102 to the fuel regulator or to the metering device 2 and back to the supply pump 102. In addition to a saving in pump output, there is connected with this measure a cross-sectional decrease of the line 8a extending from the supply pump 102 to the metering installation 2. The control diaphragm 21 is, according to FIGS. 1, 2, 3 and 3a, coordinated to the metering installation 2 and is clamped fixedly in the housing analogous to FIG. 3. Also in this case, the prestress of the differential pressure spring 35 can be adjusted from the outside, during the operation and more particularly by an adjusting cap 87a corresponding to the adjusting screw 87 of FIG. 3, by means of which an adjusting piston 85a movably supported in its longitudinal direction, can be axially actuated. A connecting line 103 leads from the control pressure space 25 to a servo pressure equalization space 104 that is disposed to the right of the larger end face 105 of the one-step piston 100, on which acts additionally a servo pressure equalization spring 106. The pump pressure $p_1$ acts against the smaller (left) end face 110 of the single-step piston whereas the servo-adjusting pressure $p_v$ is produced by the control valve 22 and is transmitted by way of a servo pressure line 109 to a servo pressure chamber 107. Also in this embodiment, the control operations take place in an analogous manner as in FIG. 1. The particular advantage of this construction resides in that during the starting of the drive unit, the fuel surge coming from the supply pump 102 does not automatically open the return-flow control valve or the single-step piston 100 insofar as the servo equalization pressure $p_2$ has not built up in the servo pressure equalization space 104. It is made impossible by this measure, that during the starting of the drive unit, the control diaphragm 21 is destroyed by the pump pressure from the control pressure space 24 before the pressure $p_2$ has built up in the control pressure space 25.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are within the scope of those skilled in the art.

We claim:

1. A differential pressure control valve assembly, especially for fuel control installations of gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, and a control diaphragm acted upon, on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo means controlled by the control diaphragm and delimiting with at least one partial piston surface at least one servo pressure chamber for receiving a working medium removed from the hydraulic circulatory system upstream of the orifice means and having a variable servo-adjusting pressure between said higher hydraulic pressure and said lower hydraulic pressure, and control valve means operatively associated with the control diaphragm and actuated by said diaphragm for modulating said servo-adjusting pressure during the occurrence of control deviations in such a manner that upon exceeding the intended value of differential pressure, a larger return-flow quantity is adjusted by said piston slide valve and in case intended dropping below the intended value of differential pressure, a smaller return-flow quantity is adjusted by said piston slide valve wherein two control pressure spaces are separated from one another by the control diaphragm, one of said control pressure spaces being in operative communication with a line section of the orifice means downstream of a metering slot and having the lower hydraulic pressure and the other of the control pressure spaces being in operative communication with a line section of the orifice means upstream of the metering slot and having the higher hydraulic pressure, said other control pressure space being operatively connected with the servo pressure chamber which is controlled for producing the variable servo-adjusting pressure by the control valve means by way of a variable valve cross section in such a manner that upon exceeding the intended value of differential pressure, the valve cross section is increased whereas upon falling below the intended value of differential pressure, the valve cross section is at least partially closed with simultaneous maintenance of a communication between the servo pressure chamber and the control pressure space with the lower hydraulic pressure by way of a throttle control bore means provided in the control valve means.

2. A differential pressure control valve assembly according to claim 1, wherein said control valve means is coordinated substantially centrally to the control diaphragm.

3. A differential pressure control valve assembly according to claim 2, wherein said control bore means is arranged in one of the two parts consisting of the control diaphragm and of the control valve means.

4. A differential pressure control valve assembly according to claim 3, wherein the control diaphragm is operatively coordinated to the piston slide valve and is securely clamped in the same.

5. A differential pressure control valve assembly according to claim 4, wherein the piston slide valve controlling the return-flow quantity is constructed as two-step piston means, the variable servo-adjusting pressure of the working medium engaging at the larger end face of the two-step piston means in one direction, whereas in the other direction the lower hydraulic pressure acts on the smaller end face of the two-stage piston means and on its smaller annular surface and the higher pressure acts on its larger annular surface, the smaller end face and smaller annular surface together being substantially equal in area to the larger annular surface and being approximately half the larger end face.

6. A differential pressure control valve assembly according to claim 5, wherein a hollow space is provided on the inside of one piston part of the two-step piston means, the hollow space being subdivided by the control diaphragm into the one control pressure space means having the lower hydraulic pressure and into the other control pressure space means having the higher hydraulic pressure which is delimited with respect to the adjoining servo pressure chamber by way of a cover means in which is arranged a bore means leading to the servo pressure chamber, the area of the cover means surrounding the last-mentioned bore means delimiting on the one hand, the valve cross section and forming, on the other, a seat for the control valve means.

7. A differential pressure control valve assembly according to claim 1, wherein the control diaphragm is operatively coordinated to the piston slide and is securely clamped in the same.

8. A differential pressure control valve assembly according to claim 1, wherein the piston slide valve controlling the return-flow quantity is constructed as two-step piston means, the variable servo-adjusting pressure of the working medium engaging at the larger end face of the two-step piston means in one direction, whereas in the other direction the lower hydraulic pressure acts on the smaller end face of the two-stage piston means and on its smaller annular surface and the higher pressure acts on its larger annular surface, the smaller end face and smaller annular surface together being substantially equal in area to the larger annular surface and being approximately half the larger end face.

9. A differential pressure control valve assembly according to claim 8, wherein a hollow space is provided on the inside of one piston part of the two-step piston means, the hollow space being subdivided by the control diaphragm into one control pressure space means having the lower hydraulic pressure and into another control pressure space means having the higher hydraulic pressure which is delimited with respect to adjoining servo pressure chamber by way of a cover means in which is arranged a bore means leading to the servo pressure chamber means, the area of the cover surrounding the last-mentioned bore means delimiting on the one hand, the valve cross section and forming, on the other, a seat for the control valve means.

10. A differential pressure control valve assembly, especially for fuel control installations of gas-turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, and a control diaphragm acted upon, on one side by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo means controlled by the control diaphragm and delimiting with at least one partial piston surface at least one servo pressure chamber for receiving a working medium removed form the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein the piston slide valve controlling the return-flow quantity is a single-step piston, the variable servo-adjusting pressure of the working medium provided in two servo pressure chambers engaging in one direction at the smaller end face and an annular surface of the single-step piston being acted upon in the other direction by the lower hydraulic pressure and simultaneously by a servo-pressure equalization spring means 11. A differential pressure control valve assembly according to claim 10, wherein an adjusting cap means is provided adjustably guided by a thread in the single-step piston as abutment for the differential pressure spring means.

12. A differential pressure control valve assembly according to claim 11, wherein a housing cover is arranged opposite the larger end face of the single step piston, said housing cover serving as support for the servo pressure equalization spring means and defining a servo pressure equalization space means which is in communication by way of an aperture in the adjusting cap means with the control pressure space means having the lower hydraulic pressure.

13. A differential pressure control valve assembly according to claim 12, characterized by its operative association with fixed orifice of the orifice means to achieve a substantially constant return-flow quantity to a hydraulic load over the entire control range independently of a variable supply pressure or a variable supply quantity.

14. A differential pressure control valve assembly, especially for fuel control installations for gas turbine drive units, operable to maintain substantially constant the differential pressure at orifice means being fixed or variable in cross section and connected in a hydraulic control circulatory system subjected to the pressure of a supply pump, which valve assembly includes piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means the differential pressure spring means, the piston slide valve controlling the return-flow quantity functioning as servo means controlled by the control diaphragm and delimiting with at least one partial piston surface at least one servo pressure chamber for receiving a working medium removed form the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein an adjusting cap means is provided adjustably guided by a thread in the piston means as an abutment for the differential pressure spring means.

15. A differential pressure control valve assembly according to claim 14, wherein a housing cover is arranged opposite the larger end face of the piston slide valve in the form of a single step piston, said housing cover serving as support for servo pressure equalization spring means and defining a servo pressure equalization space means which is in communication by way of an aperture in the adjusting cap means with a control pressure space means having the lower hydraulic pressure.

16. A differential pressure control valve assembly, especially for fuel control installations for gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo-means controlled by the control diaphragm and delimiting with at least one partial piston surface at least one servo-pressure chamber for receiving a working medium removed from the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressure, a smaller return-flow quantity is adjusted by said piston slide valve, wherein the piston slide valve controlling the return-flow quantity is a single-step piston, the variable servo-adjusting pressure of the working medium provided in two servo pressure chambers engaging in one direction at the smaller end face and at the annular surface of the single-step piston, and the larger end face of the single-step piston being acted upon in the other direction 17. A differential pressure control valve assembly according to claim 16, wherein the larger end face of the single step piston delimits a servo pressure equalization space means in which prevails a constant middle pressure lying between the higher hydraulic pressure and the lower hydraulic pressure, said middle pressure being substantially equal to the instantaneous pressure of the working medium in the servo pressure chamber with prevailing intended value of differential pressure.

18. A differential pressure control valve assembly according to claim 17, wherein within the area of the larger end face of the piston slide valve is provided a valve chamber means disposed ahead of a servo pressure equalization chamber means in the direction of flow, said valve chamber means being in communication with the line section disposed upstream of the orifice means and being controlled in the direction toward the servo pressure equalization space means by a valve diaphragm means provided with a central bore means that is so adjusted that a pressure decrease to the middle pressure takes place from the valve chamber means to the servo pressure equalization space means.

19. A differential pressure control valve assembly according to claim 18, wherein the servo pressure equalization space means is connected with the line section disposed downstream of a metering slot by way of throttle discharge bore means.

20. A differential pressure control valve assembly according to claim 19, wherein the control diaphragm is acted upon by closure spring means whose prestress is under the influence of the pump operating pressure.

21. A differential pressure control valve assembly according to claim 18, wherein the control diaphragm is acted upon by closure spring means whose prestress is under the influence of the pump operating pressure.

22. A differential pressure control valve assembly, especially for fuel control installations of gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo means controlled by the control diaphragm and delimiting with at least one partial piston surface at least one servo pressure chamber for receiving a working medium removed from the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein the control diaphragm is clamped in a fixed housing separately from the movable piston slide valve and abutment means for the differential pressure spring means is adapted to be adjustable from the outside for the adjustment of the pre-stress thereof.

23. A differential pressure control valve assembly according to claim 22, wherein as movable abutment means for the differential pressure spring means, an adjusting piston is guided in a fixed housing part, said adjusting piston being adjustable by an externally actuatable adjusting screw means.

24. A differential pressure control valve assembly according to claim 22, wherein an adjusting piston is guided in a fixed housing part as movable abutment means for the differential spring means, said adjusting piston being adjustable by an externally adjustable adjusting cap.

25. A differential pressure control valve assembly according to claim 22, wherein by its operative association with a fixed operative communication with a line section of the orifice means upstream of the metering slot and having the higher hydraulic pressure, said other control pressure space being operatively connected with the servo pressure chamber which is controlled for producing the variable servo-adjusting pressure by the control valve means by way of a variable valve cross section in such a manner that upon exceeding the intended value of differential pressure, the valve cross section is increased whereas upon falling below the intended value of differential pressure, the valve cross section is at least partially closed with simultaneous maintenance of a communication between the servo pressure chamber and the control pressure space with the lower hydraulic pressure by way of a throttle control bore means provided in the control valve means.

2. A differential pressure control valve assembly according to claim 1, wherein said control valve means is coordinated substantially centrally to the control diaphragm.

3. A differential pressure control valve assembly according to claim 2, wherein said control bore means is arranged in one of the two parts consisting of the control diaphragm and of the control valve means.

4. A differential pressure control valve assembly according to claim 3, wherein the control diaphragm is operatively coordinated to the piston slide valve and is securely clamped in the same.

5. A differential pressure control valve assembly according to claim 4, wherein the piston slide valve controlling the return-flow quantity is constructed as two-step piston means, the variable servo-adjusting pressure of the working medium engaging at the larger end face of the two-step piston means in one direction, whereas in the other direction the lower hydraulic pressure acts on the smaller end face of the two-stage piston means and on its smaller annular surface and the higher pressure acts on its larger annular surface, the smaller end face and smaller annular surface together being substantially equal in area to the larger annular surface and being approximately half the larger end face.

6. A differential pressure control valve assembly according to claim 5, wherein a hollow space is provided on the inside of one piston part of the two-step piston means, the hollow space being subdivided by the control diaphragm into the one control pressure space means having the lower hydraulic pressure and into the other control pressure space means having the higher hydraulic pressure which is delimited with respect to the adjoining servo pressure chamber by way of a cover means in which is arranged a bore means leading to the servo pressure chamber, the area of the cover means surrounding the last-mentioned bore means delimiting on the one hand, the valve cross section and forming, on the other, a seat for the control valve means.

7. A differential pressure control valve assembly according to claim 1, wherein the control diaphragm is operatively coordinated to the piston slide and is securely clamped in the same.

8. A differential pressure control valve assembly according to claim 1, wherein the piston slide valve controlling the return-flow quantity is constructed as two-step piston means, the variable servo-adjusting pressure of the working medium engaging at the larger end face of the two-step piston means in one direction, whereas in the other direction the lower hydraulic pressure acts on the smaller end face of the two-stage piston means and on its smaller annular surface and the higher pressure acts on its larger annular surface, the smaller end face and smaller annular surface together being substantially equal in area to the larger annular surface and being approximately half the larger end face.

9. A differential pressure control valve assembly according to claim 8, wherein a hollow space is provided on the inside of one piston part of the two-step piston means, the hollow space being subdivided by the control diaphragm into one control pressure space means having the lower hydraulic pressure and into another control pressure space means having the higher hydraulic pressure which is delimited with respect to adjoining servo pressure chamber by way of a cover means in which is arranged a bore means leading to the servo pressure chamber means, the area of the cover surrounding the last-mentioned bore means delimiting on the one hand, the valve cross section and forming, on the other, a seat for the control valve means.

10. A differential pressure control valve assembly, especially for fuel control installations of gas-turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, and a control diaphragm acted upon, on one side by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo means controlled by the control diaphragm and delimiting with at least one partial piston surface at least one servo pressure chamber for receiving a working medium removed form the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein the piston slide valve controlling the return-flow quantity is a single-step piston, the variable servo-adjusting pressure of the working medium provided in two servo pressure chambers engaging in one direction at the smaller end face and an annular surface of the single-step piston being acted upon in the other direction by the lower hydraulic pressure and simultaneously by a servo-pressure equalization spring means 11. A differential pressure control valve assembly according to claim 10, wherein an adjusting cap means is provided adjustably guided by a thread in the single-step piston as abutment for the differential pressure spring means.

12. A differential pressure control valve assembly according to claim 11, wherein a housing cover is arranged opposite the larger end face of the single step piston, said housing cover serving as support for the servo pressure equalization spring means and defining a servo pressure equalization space means which is in communication by way of an aperture in the adjusting cap means with the control pressure space means having the lower hydraulic pressure.

13. A differential pressure control valve assembly according to claim 12, characterized by its operative association with fixed orifice of the orifice means to achieve a substantially constant return-flow quantity to a hydraulic load over the entire control range independently of a variable supply pressure or a variable supply quantity.

14. A differential pressure control valve assembly, especially for fuel control installations for gas turbine drive units, operable to maintain substantially constant the differential pressure at orifice means being fixed or variable in cross section and connected in a hydraulic control circulatory system subjected to the pressure of a supply pump, which valve assembly includes piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means the differential pressure spring means, the piston slide valve controlling the return-flow quantity functioning as servo means controlled by the control diaphragm and delimiting with at least one partial piston surface at least one servo pressure chamber for receiving a working medium removed form the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein an adjusting cap means is provided adjustably guided by a thread in the piston means as an abutment for the differential pressure spring means.

15. A differential pressure control valve assembly according to claim 14, wherein a housing cover is arranged opposite the larger end face of the piston slide valve in the form of a single step piston, said housing cover serving as support for servo pressure equalization spring means and defining a servo pressure equalization space means which is in communication by way of an aperture in the adjusting cap means with a control pressure space means having the lower hydraulic pressure.

16. A differential pressure control valve assembly, especially for fuel control installations for gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo-means controlled by the control diaphragm and delimiting with at least one partial piston surface at least one servo-pressure chamber for receiving a working medium removed from the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressure, a smaller return-flow quantity is adjusted by said piston slide valve, wherein the piston slide valve controlling the return-flow quantity is a single-step piston, the variable servo-adjusting pressure of the working medium provided in two servo pressure chambers engaging in one direction at the smaller end face and at the annular surface of the single-step piston, and the larger end face of the single-step piston being acted upon in the other direction 17. A differential pressure control valve assembly according to claim 16, wherein the larger end face of the single step piston delimits a servo pressure equalization space means in which prevails a constant middle pressure lying between the higher hydraulic pressure and the lower hydraulic pressure, said middle pressure being substantially equal to the instantaneous pressure of the working medium in the servo pressure chamber with prevailing intended value of differential pressure.

18. A differential pressure control valve assembly according to claim 17, wherein within the area of the larger end face of the piston slide valve is provided a valve chamber means disposed ahead of a servo pressure equalization chamber means in the direction of flow, said valve chamber means being in communication with the line section disposed upstream of the orifice means and being controlled in the direction toward the servo pressure equalization space means by a valve diaphragm means provided with a central bore means that is so adjusted that a pressure decrease to the middle pressure takes place from the valve chamber means to the servo pressure equalization space means.

19. A differential pressure control valve assembly according to claim 18, wherein the servo pressure equalization space means is connected with the line section disposed downstream of a metering slot by way of throttle discharge bore means.

20. A differential pressure control valve assembly according to claim 19, wherein the control diaphragm is acted upon by closure spring means whose prestress is under the influence of the pump operating pressure.

21. A differential pressure control valve assembly according to claim 18, wherein the control diaphragm is acted upon by closure spring means whose prestress is under the influence of the pump operating pressure.

22. A differential pressure control valve assembly, especially for fuel control installations of gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo means controlled by the control diaphragm and delimiting with at least one partial piston surface at least one servo pressure chamber for receiving a working medium removed from the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein the control diaphragm is clamped in a fixed housing separately from the movable piston slide valve and abutment means for the differential pressure spring means is adapted to be adjustable from the outside for the adjustment of the pre-stress thereof.

23. A differential pressure control valve assembly according to claim 22, wherein as movable abutment means for the differential pressure spring means, an adjusting piston is guided in a fixed housing part, said adjusting piston being adjustable by an externally actuatable adjusting screw means.

24. A differential pressure control valve assembly according to claim 22, wherein an adjusting piston is guided in a fixed housing part as movable abutment means for the differential spring means, said adjusting piston being adjustable by an externally adjustable adjusting cap.

25. A differential pressure control valve assembly according to claim 22, wherein by its operative association with a fixed orifice of the orifice means to achieve a substantially constant return-flow quantity to a hydraulic load over the entire control range independently of a variable supply pressure or a variable supply quantity.

26. A differential pressure control valve assembly, especially for fuel control installations of gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo means controlled by the control diaphragm and delimiting, with at least one partial piston surface at least one servo-pressure chamber for receiving a working medium removed from the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein by operative association of the valve assembly with a fixed orifice of the orifice means achieves a substantially constant return-flow quantity to a hydraulic load over the entire control range independently of a variable supply pressure or a variable supply quantity.

27. A differential pressure control valve assembly, especially for fuel control installations of gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, a control diaphragm acted upon on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo means controlled by the control diaphragm and delimiting with at least one partial piston surface at least one servo-pressure chamber for receiving a working medium removed from the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve and in case of dropping below the intended value of differential pressures, a smaller return-flow quantity is adjusted by said piston slide valve, wherein the piston slide valve is coordinated to the supply pump limit whereas the control installation producing the variable servo-adjusting pressure for the adjustment of the piston slide valve is coordinated to the control assembly, and the variable servo-adjusting pressure is transmitted by way of a pressure line to a servo pressure chamber defined on the one hand by the piston slide valve.

28. A differential pressure control valve assembly according to claim 27, wherein the piston slide valve is constructed as single-step piston means, and wherein said single-step piston means is acted upon in the direction, in which it opens up discharge control bore means, on its smaller end face by the pump pressure and in the same direction with respect thereto, on its annular surface by the variable servo-adjusting pressure whereas in the opposite direction the lower hydraulic pressure as well as a servo-pressure equalization spring means engage at the larger end face.

29. A differential pressure control valve assembly according to claim 28, wherein for the purpose of preselecting the intended value of differential pressure between the line section disposed upstream of a metering slot and the control pressure space in communication therewith, there is arranged a flow throttle means adjustable in its flow cross section 30. A differential pressure control valve assembly, especially for fuel control installations of gas turbine drive units, operable to maintain substantially constant the differential pressure at orifice means being fixed or variable in cross section and connected in a hydraulic control circulatory system subjected to the pressure of a supply pump, which valve assembly includes a piston slide valve operatively associated with the orifice means and controlling return-flow quantity flowing back to the supply pump, the piston slide valve being equalized as to forces in both adjusting directions with an existing intended value of differential pressure, a control diaphragm acted upon, on one side, by the higher hydraulic pressure prevailing upstream of the orifice means and, on the other side, by the lower hydraulic pressure downstream of the orifice means as well as by the pressure of differential pressure spring means, the piston slide valve controlling the return-flow quantity functioning as servo-means controlled by the control diaphragm and delimiting with at least one partial piston surface at least one servo pressure chamber for receiving a working medium removed from the hydraulic circulatory system upstream of the orifice means and having a variable servo-adjusting pressure between said higher hydraulic pressure and said lower hydraulic pressure, and control valve means operatively associated with and actuated by said control diaphragm for modulating said servo-adjusting pressure during the occurrence of control deviations in such a manner that upon exceeding the intended value of differential pressure, a larger return-flow quantity is adjusted by said piston slide valve, wherein for the purpose of preselecting the intended value of differential pressure between the line section disposed upstream of a metering slot and the control pressure space in communication therewith, there is arranged a flow throttle means adjustable in its flow cross section.